United States Patent
Kwak (10) Patent No.: US 9,191,801 B2
(45) Date of Patent: Nov. 17, 2015

(54) METHOD AND APPARATUS FOR SPATIAL FILTERING USING DIFFERENCE IN PROPAGATION DELAY BETWEEN ELECTROMAGNETIC SIGNAL AND ACOUSTIC SIGNAL

(71) Applicant: ELECTRONICS AND TELECOMMUNICATIONS RESEARCH INSTITUTE, Daejeon (KR)

(72) Inventor: Byung Jae Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/334,311

(22) Filed: Jul. 17, 2014

(65) Prior Publication Data

US 2015/0031403 A1    Jan. 29, 2015

(30) Foreign Application Priority Data

Jul. 23, 2013   (KR) .................. 10-2013-0086843

(51) Int. Cl.
*H04B 7/00* (2006.01)
*H04W 8/00* (2009.01)
*H04W 76/02* (2009.01)

(52) U.S. Cl.
CPC ............ *H04W 8/005* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 7,020,273 B2 * | 3/2006 | Kraft et al. | 379/387.01 |
| 7,729,204 B2 | 6/2010 | Peng et al. | |
| 2002/0009972 A1 * | 1/2002 | Amento et al. | 455/66 |
| 2006/0239484 A1 * | 10/2006 | Hamacher et al. | 381/312 |
| 2008/0117096 A1 * | 5/2008 | Eckel et al. | 342/134 |
| 2010/0159828 A1 * | 6/2010 | Rhodes et al. | 455/40 |
| 2011/0143677 A1 * | 6/2011 | Jung et al. | 455/67.11 |
| 2011/0177828 A1 * | 7/2011 | Bocquet et al. | 455/456.1 |
| 2013/0286903 A1 * | 10/2013 | Khojastepour et al. | 370/280 |

FOREIGN PATENT DOCUMENTS

KR    10-2012-0087164 A    8/2012

* cited by examiner

*Primary Examiner* — Dominic E Rego
(74) *Attorney, Agent, or Firm* — NSIP Law

(57) ABSTRACT

A method and apparatus related to spatial filtering to select target terminals only located at a predetermined distance among a plurality of target terminals, using a propagation delay between an electromagnetic signal and an acoustic signal are provided. A user terminal transmits the acoustic signal to neighboring terminals to select terminals of which distances from the user terminal correspond to a distance from the user terminal to a target terminal among neighboring terminals. The electromagnetic signal is transmitted to the neighboring terminals in a predetermined transmission delay. Response signals are received from neighboring terminals of which distances from the user terminal are within a predetermined range, among the neighboring terminals that have received the acoustic signal and the electromagnetic signal. The neighboring terminals receive the acoustic signal from the user terminal, and receive the electromagnetic signal transmitted in the transmission delay from the user terminal.

15 Claims, 7 Drawing Sheets

METHOD AND APPARATUS FOR SPATIAL FILTERING USING DIFFERENCE IN PROPAGATION DELAY BETWEEN ELECTROMAGNETIC SIGNAL AND ACOUSTIC SIGNAL

CROSS-REFERENCE TO RELATED APPLICATION

This application claims the benefit of Korean Patent Application No. 10-2013-0086843, filed on Jul. 23, 2013, in the Korean Intellectual Property Office, the disclosure of which is incorporated herein by reference.

BACKGROUND

1. Field of the Invention

The present invention relates to a technology of spatial filtering that selects target terminals only located within a predetermined distance among a plurality of targets using a difference in propagation delay between an electromagnetic signal and an acoustic signal.

2. Description of the Related Art

In conventional arts, one of general problems that occurs in wireless communications is the problem of selecting a peer to communicate with among a plurality of neighboring terminals. In particular, the problem frequently occurs in localized wireless communications such as device-to-device (D2D) communications recently drawing much interest.

Methods widely used to select a target terminal for communication include a scan and select method used in various communications protocols such as Bluetooth. According to the scan and select method, a terminal scans neighboring terminals and a user selects a target terminal to communicate with from a list of neighboring terminals found by the scan. However, the scan and select method takes a long time for scanning and, moreover, may give an extremely long list of the neighboring terminals to the user when numerous neighboring terminals are found by the scan.

In this case, spatial filtering may be used, which filters neighboring terminals using location information of the target terminal to communicate with. Therefore, time required for selecting a target terminal may be greatly reduced. In addition, user convenience may be greatly improved.

SUMMARY

An aspect of the present invention provides a spatial filtering method capable of filtering out neighboring terminals only located within a predetermined distance among a plurality of neighboring terminals while minimizing communication between terminals.

According to an aspect of the present invention, there is provided a method of spatial filtering using a difference in propagation delay between an electromagnetic signal and an acoustic signal, the method including a user terminal transmitting the acoustic signal to neighboring terminals to select terminals of which distances from the user terminal correspond to a distance from the user terminal to a target terminal among neighboring terminals, transmitting the electromagnetic signal to the neighboring terminals after a predetermined transmission delay using the distance from the user terminal to the target terminal, and receiving response signals from neighboring terminals of which distances from the user terminal are within a predetermined range, among the neighboring terminals that have received the acoustic signal and the electromagnetic signal.

The distance from the user terminal to the target terminal may be stored in the user terminal in advance.

The transmission delay may be determined using the distance from the user terminal to the target terminal.

The predetermined transmission delay may be determined by Equation 3:

$$t = d/V_a - d/V_e + T_o$$

wherein, d denotes the distance from the user terminal to the target terminal, $V_a$ denotes a speed of the acoustic signal, $V_e$ denotes a speed of the electromagnetic signal, and $T_o$ denotes an offset of the transmission delay.

According to an aspect of the present invention, there is also provided a method of spatial filtering using a difference in propagation delay between an electromagnetic signal and an acoustic signal, the method including a neighboring terminal receiving the acoustic signal from a user terminal, receiving the electromagnetic signal transmitted after a transmission delay predetermined using the distance from the user terminal to the target terminal, determining whether the neighboring terminal corresponds to the target terminal using a reception time difference between the acoustic signal and the electromagnetic signal from the user terminal to neighboring terminals, and transmitting a response signal to the user terminal when the reception time difference is within a predetermined range.

The determining may be performed using the reception time difference between the acoustic signal and the electromagnetic signal.

The distance information may correspond to the distance between the user terminal and the target terminal when the reception time difference between the acoustic signal and the electromagnetic signal is zero, and also corresponds to the target terminal when the reception time difference is within a predetermined range.

According to an aspect of the present invention, there is also provided an apparatus for spatial filtering using a difference in propagation delay between an electromagnetic signal and an acoustic signal, the apparatus including a distance information measurement unit storing a distance from a user terminal to a target terminal, a transmission unit to transmit an acoustic signal and an electromagnetic signal with a transmission delay predetermined using the distance to determine whether neighboring terminals correspond to the target terminal, and a response signal receiving unit to receive a response signal from neighboring terminals that have received the acoustic signal and the electromagnetic signal.

The transmission unit may include a signal and data transmission unit to transmit the acoustic signal and the electromagnetic signal, and a transmission time control unit to control transmission delay for transmission of the electromagnetic signal.

The signal and data transmission unit may transmit the electromagnetic signal after a transmission delay preset by the transmission time control unit.

The transmission time control unit may control the transmission delay for transmission of the acoustic signal and the electromagnetic signal to the neighboring terminals using the distance from the user terminal to the target terminal.

The receiving unit to receive the response signal may receive the response signal from neighboring terminals of which a reception time difference between the acoustic signal and the electromagnetic signal received by the neighboring terminals is within a predetermined range, among the neighboring terminals that have received the acoustic signal and the electromagnetic signal.

According to an aspect of the present invention, there is provided an apparatus for spatial filtering using a difference in propagation delay between an electromagnetic signal and an acoustic signal, the apparatus including a receiving unit to receive an acoustic signal and an electromagnetic signal, a determination unit to determine whether a neighboring terminal corresponds to a target terminal using the acoustic signal and the electromagnetic signal, and a response signal transmission unit to transmit a response signal from the neighboring terminal corresponding to the target terminal to a user terminal.

The determination unit may include a subtraction unit to obtain a reception time difference between the acoustic signal and the electromagnetic signal, and a comparison unit to determine whether a distance from the user terminal to the neighboring terminal correspond to a distance from the user terminal to the target terminal using the reception time difference.

The comparison unit may determine that the distance information corresponds to the distance between the user terminal and the target terminal when the reception time difference is zero, and also corresponds to the target terminal when the reception time difference is within a predetermined range.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout.

Figure 1:
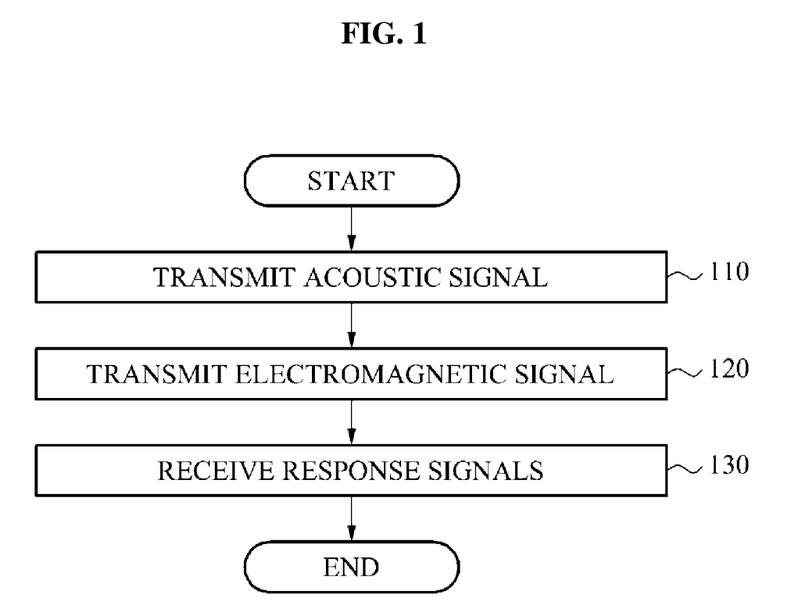
FIG. 1 is a flowchart illustrating a spatial filtering method of a user terminal according to an embodiment of the present invention.

FIG. 1 is a flowchart illustrating a spatial filtering method of a user terminal according to an embodiment of the present invention.

In operation 110, the user terminal may transmit an acoustic signal to neighboring terminals, to select terminals of which distances from the user terminal correspond to a distance from the user terminal to a target terminal among neighboring terminals. Here, the distance information between the user terminal and the target terminal may be stored in the user terminal in advance.

In operation 120, the user terminal may transmit an electromagnetic signal to the neighboring terminals in a predetermined transmission delay to select the terminals of which the distances from the user terminal correspond to the distance from the user terminal to the target terminal. The predetermined transmission delay may be expressed by Equation 1.

$$t = d/V_a - d/V_e \qquad \text{[Equation 1]}$$

Here, d denotes the distance from the user terminal to the target terminal, $V_a$ denotes a transmission speed of an acoustic signal, and $V_e$ denotes a transmission speed of an electromagnetic signal. Since $V_e$ is much greater than $V_a$, in general, Equation 1 may be approximated to Equation 2.

$$t = d/V_a \qquad \text{[Equation 2]}$$

Equation 2 may be generalized to Equation 3 by adding an offset $T_o$.

$$t = d/V_a - d/V_e + T_o \qquad \text{[Equation 3]}$$

Here, $T_o$ may be known in advance by neighboring terminals receiving the acoustic signal and the electromagnetic signal. $T_o$ may be a positive number, a negative number, or zero.

The user terminal may transmit the electromagnetic signal after a predetermined transmission delay using the distance from the user terminal to the target terminal Therefore, only neighboring terminals of which the distance is within a predetermined range among the neighboring terminals may have $T_o$ as the reception time difference between the acoustic signal and the electromagnetic signal.

In operation 130, the user terminal may receive response signals from the neighboring terminals of which the distance from the user terminal is within the predetermined range, among the neighboring terminals that have received the acoustic signal and the electromagnetic signal in operations 110 and 120.

For example, the reception time difference of the neighboring terminal corresponding to the target terminal may be $T_o$ and, in this case, $T_o$ may be zero. However, a error may occur to a distance d from the user terminal to the target terminal due to a variety of reasons such as an error in implementation. Even when the neighboring terminal corresponds to the target terminal, simultaneous receiving of the acoustic signal and the electromagnetic signal may not be perfectly achieved. Therefore, when the reception time difference between the acoustic signal and the electromagnetic signal is within a predetermined range $(T_o - \Delta t/2) \sim (T_o + \Delta t/2)$, it may be determined that the corresponding neighboring terminal is separated from the user terminal by a distance d which is the distance from the user terminal to the target terminal.

Figure 2:
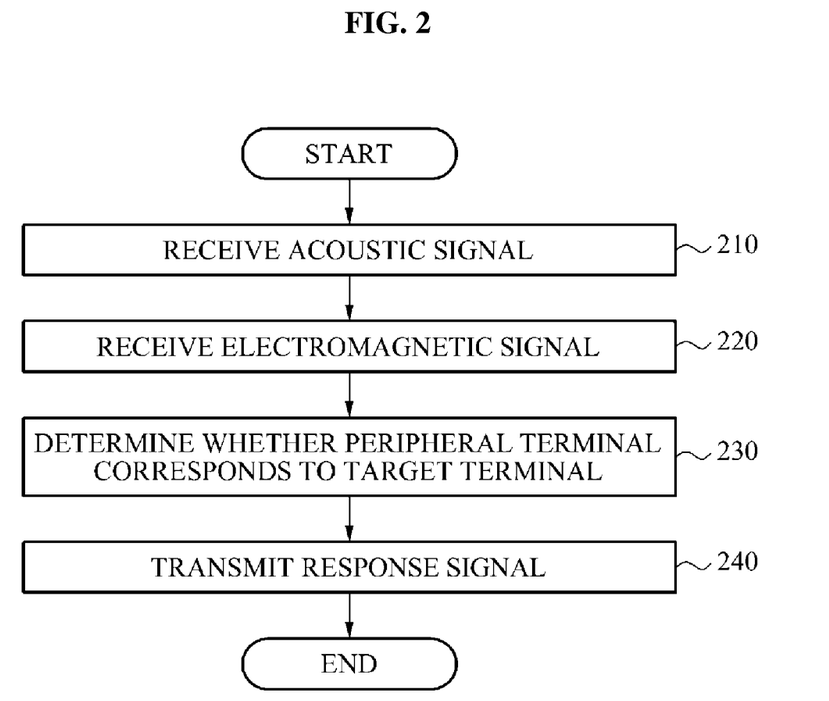
FIG. 2 is a flowchart illustrating a spatial filtering method of neighboring terminals according to an embodiment of the present invention.

FIG. 2 is a flowchart illustrating a spatial filtering method of a neighboring terminal according to an embodiment of the present invention.

Referring to FIG. 2, in operation 210, the neighboring terminal may receive an acoustic signal from the user terminal.

In operation 220, the neighboring terminal may receive an electromagnetic signal transmitted in a predetermined transmission delay using the distance d from the user terminal to the target terminal.

In operation 230, the neighboring terminal may determine whether the distance of the neighboring terminal from the user terminal corresponds to the distance from the user terminal to the target terminal, using the acoustic signal and the electromagnetic signal received in operations 210 and 220.

Here, whether the distance from the user terminal to the neighboring terminal corresponds to the distance from the user terminal to the target terminal may be determined using the reception time difference between the acoustic signal and the electromagnetic signal.

For example, a neighboring terminal having a reception time difference between the acoustic signal and the electromagnetic signal greater than $T_o$ may be located nearer to the user terminal than the target terminal A neighboring terminal having the reception time difference smaller than $T_o$ may be located farther from the user terminal than the target terminal.

A reception time difference of a neighboring terminal corresponding to the target terminal may be $T_o$. However, an error may occur in a distance d from the user terminal to the target terminal due to a variety of reasons such as an error in implementation. Even when the neighboring terminal corresponds to the target terminal, the reception time difference may not accurately be $T_o$. Therefore, when the reception time difference between the acoustic signal and the electromagnetic signal is within a range (To−Δt/2)~(To+Δt/2), it may be determined that the distance from the user terminal to the target terminal may correspond to the distance d from the user terminal to the target terminal. In operation 240, a neighboring terminal of which the reception time difference is within a predetermined range may transmit a response signal to the user terminal.

Figure 3:
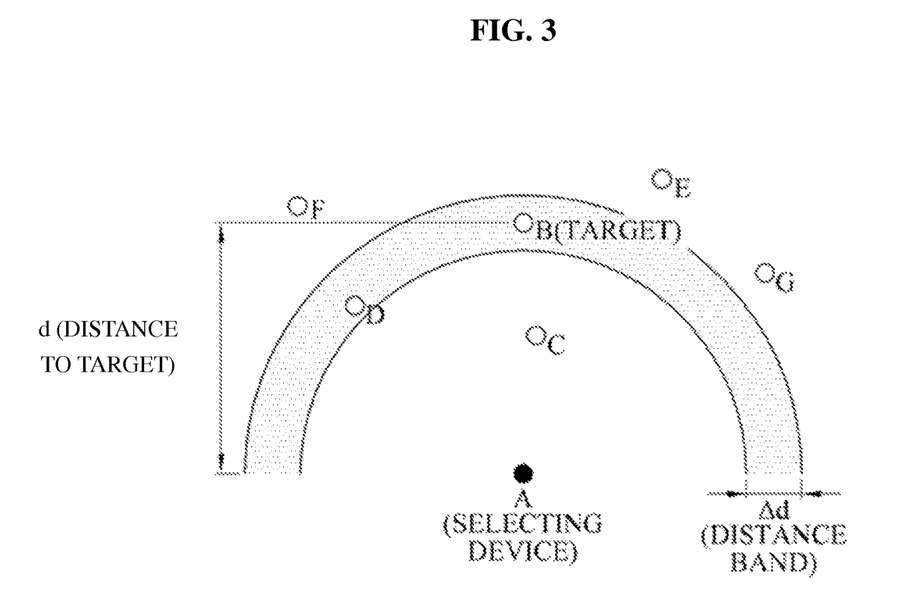
FIG. 3 is a diagram illustrating a user terminal and neighboring terminals according to an embodiment of the present invention.

Among neighboring terminals, a neighboring terminal of which the reception time difference between the acoustic signal and the electromagnetic signal is within the predetermined range (To−Δt/2)~(To+Δt/2) may be the target terminal. The neighboring terminal of which the reception time difference is within the predetermined range (To−Δt/2)~(To+Δt/2) may transmit the response signal to the user terminal, the response signal indicating that the neighboring terminal may be the target terminal to be communicated with the user terminal. FIG. 3 is a diagram illustrating a user terminal and neighboring terminals according to an embodiment of the present invention.

FIG. 3 shows a user terminal A, a target terminal B, and neighboring terminals B, C, D, E, F, and G including the target terminal B. In FIG. 3, d denotes a distance from the user terminal to the target terminal, and Δd denotes a predetermined range to determine the target terminal.

According to the embodiment, the user terminal A may perform distance filtering that selects the target terminal B separated from the user terminal by the distance d from the user terminal to the target terminal, among the neighboring terminals B to G, while minimizing communication between terminals.

It is presumed that the user terminal A is to select the target terminal B among the neighboring terminals B to G. Here, the user terminal A may store the distance d from the user terminal to the target terminal in advance.

The target terminal B to be communicated with the user terminal A may be selected using a difference in a transmission speed between an acoustic signal and an electromagnetic signal. This process is described in detail with reference to FIGS. 2 and 3.

Figure 4:
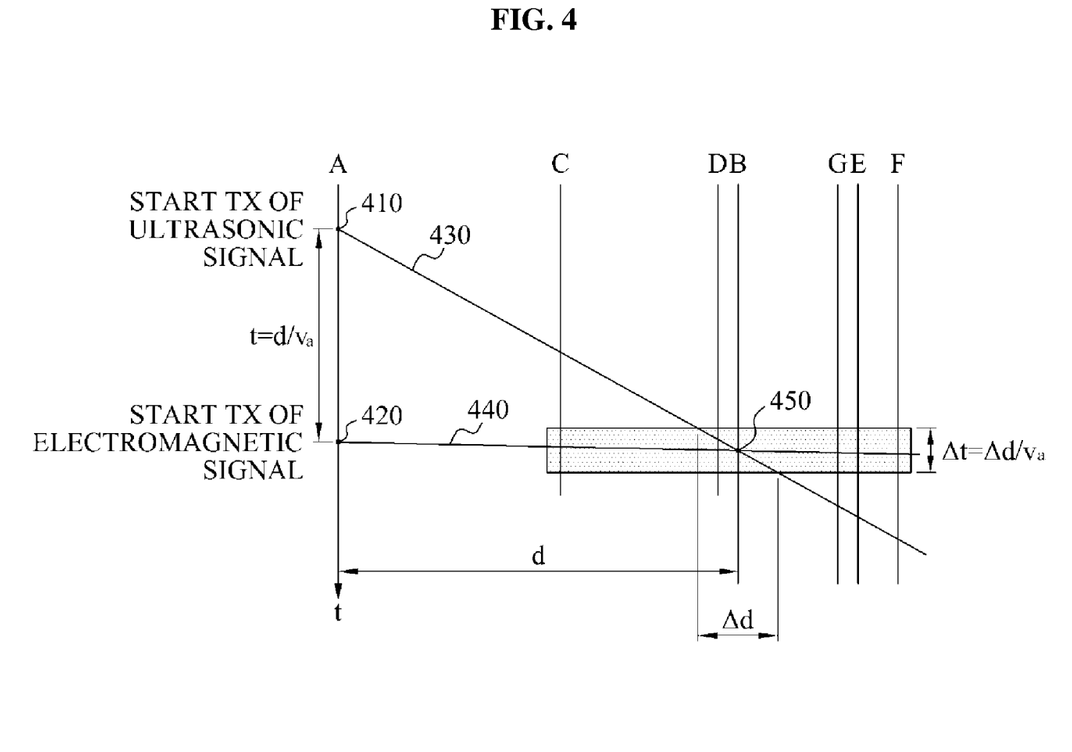
FIG. 4 is a graph illustrating relations between an electromagnetic signal reception time and an acoustic signal reception time with respect to distances to neighboring terminals, according to an embodiment of the present invention.

FIG. 4 is a graph illustrating relationship between an electromagnetic signal reception time and an acoustic signal reception time with respect to distances to neighboring terminals B to G, according to an embodiment of the present invention.

Referring to FIG. 4, vertical lines A to F denote locations of terminals. Therefore, distances from a user terminal A to the neighboring terminals B to G are shown.

Here, a reference numeral 410 may denote a transmission start point of the acoustic signal, and a reference numeral 420 may denote a transmission start point of the electromagnetic signal. The user terminal A may transmit the acoustic signal first and then transmit the electromagnetic signal in a transmission delay as much as t=d/$V_a$−d/$V_e$. Relationship between the reception time of the acoustic signal and the distance of the neighboring terminal receiving the acoustic signal may be expressed by a straight line 430. Relationship between the reception time of the electromagnetic signal and the distance of the neighboring terminal receiving the electromagnetic signal may be expressed by a straight line 440. An intersection point between the straight lines 430 and 440 may indicate a distance from the user terminal, of the neighboring terminal which simultaneously receives the acoustic signal and the electromagnetic signal.

Therefore, the target terminal B separated from the user terminal by the distance d from the user terminal A to the target terminal may simultaneously receive the acoustic signal and the electromagnetic signal. Thus, the target terminal B to communicate with may be selected using a reception time difference between the acoustic signal and the electromagnetic signal.

However, an error may occur in the distance d from the user terminal to the target terminal due to a variety of reasons such as an error in implementation. Even when the neighboring terminal corresponds to the target terminal, simultaneous reception of the acoustic signal and the electromagnetic signal may not be perfectly achieved. Therefore, when the reception time difference between the acoustic signal and the electromagnetic signal is within a predetermined range Δt, it may be determined that the acoustic signal and the electromagnetic signal are simultaneously received. This may be not distance filtering for selecting only the target terminal B located accurately at the distance d from the user terminal but distance filtering for selecting neighboring terminals of which distances from the user terminal are within the range (d−Δd/2)~(d+Δd/2), as shown in FIG. 4.

For example, referring to FIG. 4, a neighboring terminal C may receive the acoustic signal first and then receive the electromagnetic signal. Therefore, the neighboring terminal C may be understood to be located nearer than the target terminal B to be communicated with the user terminal A.

Neighboring terminals E, F, and G may receive the electromagnetic signal first and then receive the acoustic signal. Therefore, the neighboring terminals E, F, and G may be understood to be located farther than the target terminal B to be communicated with the user terminal A.

Conversely, the reception time difference of the acoustic signal and the electromagnetic signal at the target terminal B is "zero." Therefore, the target terminal B may be determined to be the target terminal to be communicated with the user terminal A.

In case of a neighboring terminal D, the reception time of the acoustic signal is earlier than the reception time of the electromagnetic signal. However, the reception time difference between the acoustic signal and the electromagnetic signal is within the predetermined range $\Delta t$. Therefore, since the neighboring terminal D is located within the range $(d-\Delta d/2)\sim(d+\Delta d/2)$ from the user terminal A, the neighboring terminal D may also be the target terminal. As described with reference to FIG. 4, according to the embodiment, the neighboring terminals B to G may receive the acoustic signal and the electromagnetic signal from the user terminal A and compare the reception times of the two signals, accordingly determining whether the neighboring terminals B to G are located within the range $(d-\Delta d/2)\sim(d+\Delta d/2)$. The neighboring terminals B and D located within the range $(d-\Delta d/2)\sim(d+\Delta d/2)$ may transmit the response signal to the user terminal A.

Figure 5:
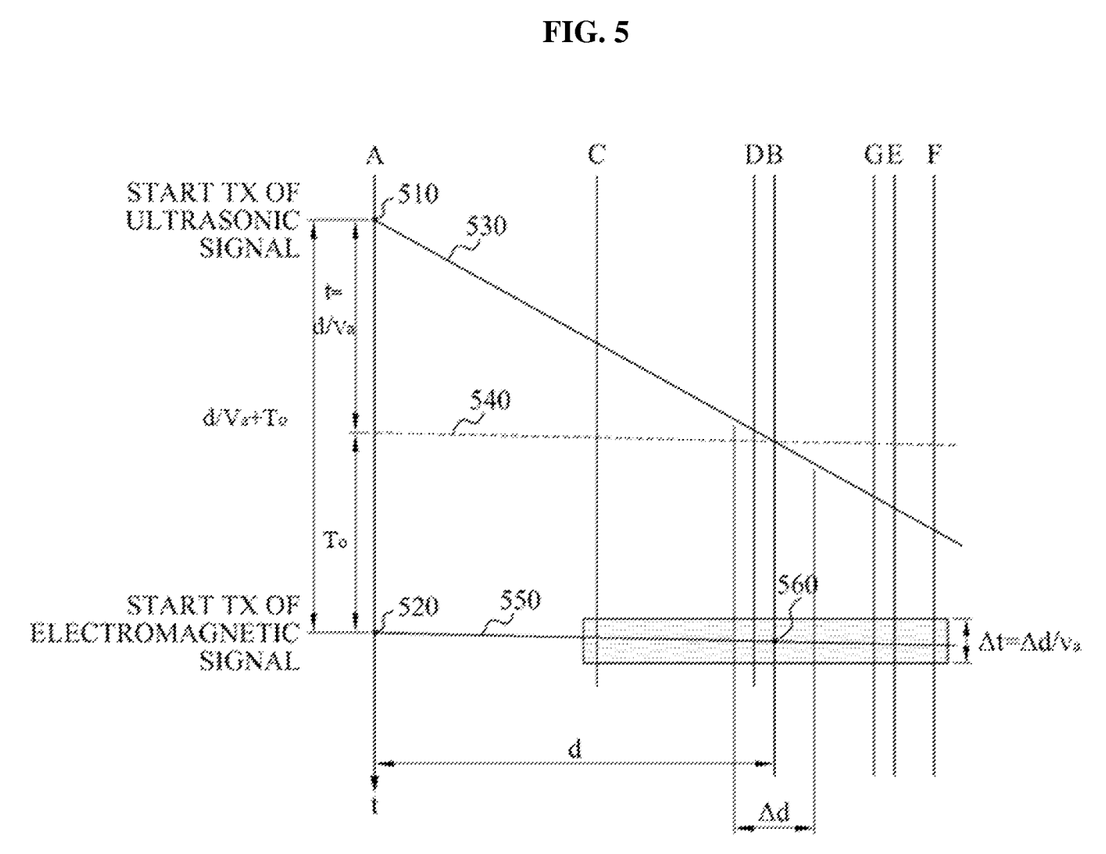
FIG. 5 is a graph illustrating relations between an electromagnetic signal reception time and an acoustic signal reception time with respect to distances to neighboring terminals when a transmission delay including an offset is included, according to an embodiment of the present invention.

As an application example, in device-to-device (D2D) communications, a user terminal may select a terminal only located at a predetermined distance from the user terminal using the user terminal. In this case, terminals only located at the predetermined distance may respond to signals transmitted by the user terminal. Therefore, when a conventional scan-and-scan method is used, identifiers (IDs) may be received from all neighboring terminals and, after that, only target terminal to be communicated with the user terminal needs to be selected from a list of the all IDs. However, according to the embodiment, only the neighboring terminals B and D located within the predetermined range $(d-\Delta d/2)\sim(d+\Delta d/2)$ may transmit the response signal and the target terminal B to be communicated may be selected. Therefore, user inconvenience may be considerably reduced. FIG. 5 is a graph illustrating relationship of a reception time between an electromagnetic signal and an acoustic signal transmission delay with respect to distances to neighboring terminals when a transmission delay having an offset is included, according to an embodiment of the present invention.

Referring to FIG. 5, in the same manner as FIG. 4, vertical lines A to F denote locations of terminals. Therefore, distances from a user terminal A to the neighboring terminals B to G are shown.

A reference numeral 510 may denote a transmission time of the acoustic signal. A reference numeral 520 may denote a transmission time of the electromagnetic signal having a transmission delay including an offset as much as $T_o$. The user terminal A may transmit the electromagnetic signal in a transmission delay as much as $d/V_a-d/V_e+T_o$ after the acoustic signal is transmitted first. Relationship between the reception time of the acoustic signal and the distance of the neighboring terminal receiving the acoustic signal may be denoted by a straight line 530. Relationship between the reception time of the electromagnetic signal transmitted after the transmission delay not including the transmission delay offset and the distance of the neighboring terminal receiving the electromagnetic signal may be denoted by a straight line 540. Relationship of the reception time of the electromagnetic signal transmitted after the transmission delay having the transmission delay offset as much as $T_o$ and the distance of the neighboring terminal receiving the electromagnetic signal may be denoted by a straight line 550.

An intersectional point 560 obtained by adding the transmission delay offset $T_o$ to an intersection point between the straight lines 530 and 540 may denote the distance from the user terminal, of the neighboring terminal which receives the electromagnetic signal in the offset $T_o$ after receiving the acoustic signal. Therefore, a target terminal B separated from the user terminal by a distance d from the user terminal A to the target terminal may receive the electromagnetic signal in the offset $T_o$ after receiving the acoustic signal.

When the transmission times of the acoustic signal and the electromagnetic signal have the transmission delay including the offset, when the reception time difference between the acoustic signal and the electromagnetic signal transmission delay is within a predetermined range, that is, $(T_o-\Delta t/2)\sim(T_o+\Delta t/2)$, the target terminal B may determine that the two signals have been received with a difference as much as the offset $T_o$. That is, this may be not distance filtering for selecting only the target terminal B located accurately at the distance d from the user terminal but distance filtering for selecting neighboring terminals of which distances from the user terminal are within the range $(d-\Delta d/2)\sim(d+\Delta d/2)$, as shown in FIG. 5. $T_o$ may be known by all the neighboring terminals, and may be a positive number, a negative number, or zero.

Referring to FIG. 5, for example, a reception time difference between the acoustic signal and the electromagnetic signal of a neighboring terminal C may be greater than $T_o$. Therefore, the neighboring terminal C may be understood to be located nearer than the target terminal B to be communicated with the user terminal A.

Reception time differences of neighboring terminals E, F, and G may be smaller than $T_o$. Therefore, the neighboring terminals E, F, and G may be understood to be located farther than the target terminal B to be communicated with the user terminal A.

Conversely, the reception time difference of the target terminal B is $T_o$. Therefore, the target terminal B may be understood to be the target terminal to be communicated with the user terminal A.

In case of a neighboring terminal D, the reception time difference between the acoustic signal and the electromagnetic signal is greater than $T_o$. However, the reception time difference is within the predetermined range $(T_o-\Delta t/2)\sim(T_o+\Delta t/2)$. Therefore, since the neighboring terminal D is located within the range $(d-\Delta d/2)\sim(d+\Delta d/2)$ from the user terminal A, the neighboring terminal D may also be determined to be the target terminal to be communicated with the user terminal A.

Figure 6:
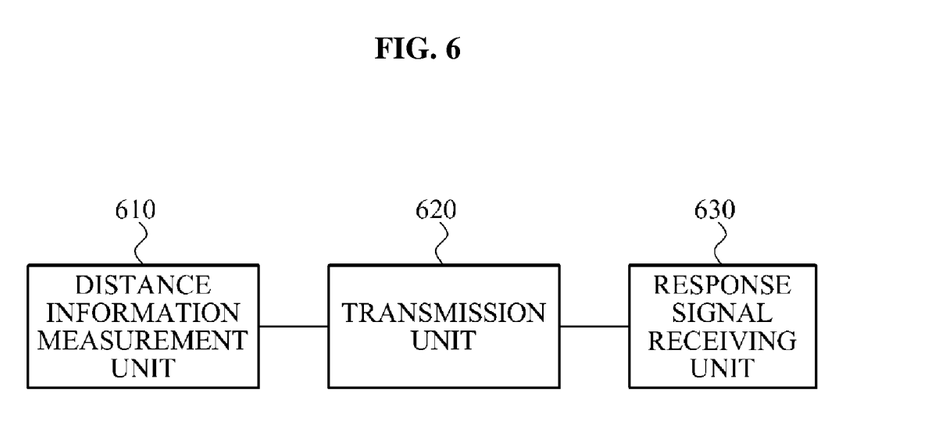
FIG. 6 is a diagram illustrating a configuration of a user terminal according to an embodiment of the present invention.

FIG. 6 is a diagram illustrating a configuration of a user terminal according to an embodiment of the present invention.

The user terminal may include a distance information measurement unit 610, a transmission unit 620, and a response signal receiving unit 630.

The distance information measurement unit 610 may measure and store in advance distance information related to a distance from the user terminal to a target terminal. The user terminal may determine a transmission delay of an electromagnetic signal using the distance from the user terminal to the target terminal.

The transmission unit 620 may transmit an acoustic signal and the electromagnetic signal. The electromagnetic signal may be transmitted in a predetermined transmission delay using the distance from the user terminal to the target terminal after the acoustic signal is transmitted. The transmission unit 620 will be described in detail with reference to FIG. 7.

The response signal receiving unit 630 may receive the response signal from the neighboring terminals that have received the acoustic signal and the electromagnetic signal. In detail, the response signal may be received from neighboring terminals of which distance from the user terminal is within the predetermined range among the neighboring terminals that have received the acoustic signal and the electromagnetic signal.

Figure 7:
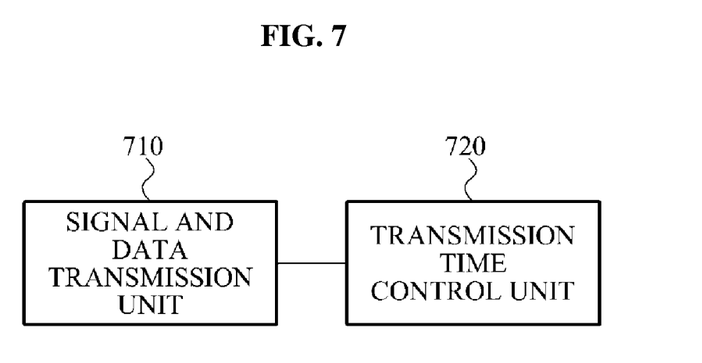
FIG. 7 is a diagram illustrating a configuration of a transmission unit of the user terminal, according to an embodiment of the present invention.

FIG. 7 is a diagram illustrating a configuration of the transmission unit 620 of the user terminal, according to an embodiment of the present invention.

The transmission unit 620 may include a signal and data transmission unit 710 and a transmission time control unit 720.

The signal and data transmission unit 710 may transmit an acoustic signal and an electromagnetic signal to neighboring terminals.

The neighboring terminals may determine whether distances from the user terminal to the neighboring terminals correspond to the distance from the user terminal to the target terminal, using the acoustic signal and the electromagnetic signal. Here, the transmission unit 620 may transmit the electromagnetic signal in a transmission delay predetermined in the transmission time control unit 720.

The transmission time control unit 720 may control the transmission delay of the electromagnetic signal so that the neighboring terminals separated from the user terminal by the distance from the user terminal to the target terminal may simultaneously receive the acoustic signal and the electromagnetic signal. The transmission delay may be determined using Equation 1.

$$t = d/V_a - d/V_e \quad \text{[Equation 1]}$$

Here, d denotes the distance from the user terminal to the target terminal, $V_a$ denotes a transmission speed of an acoustic signal, and $V_e$ denotes a transmission speed of an electromagnetic signal. Since $V_e$ is much greater than $V_a$, in general, Equation 1 may be approximated to Equation 2.

$$t = d/V_a \quad \text{[Equation 2]}$$

Equation 1 may be generalized to Equation 3 by adding an offset $T_o$.

$$t = d/V_a - d/V_e + T_o \quad \text{[Equation 3]}$$

Here, $T_o$ may be known in advance by neighboring terminals receiving the acoustic signal and the electromagnetic signal. $T_o$ may be a positive number, a negative number, or zero.

Figure 8:
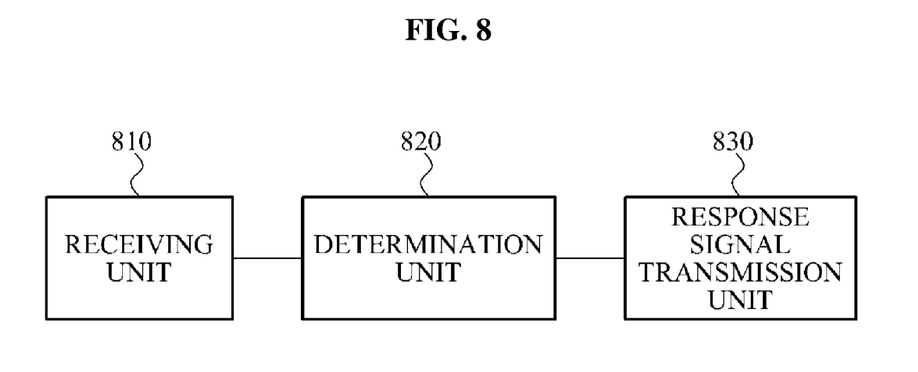
FIG. 8 is a diagram illustrating a configuration of a neighboring terminal according to an embodiment of the present invention.

FIG. 8 is a diagram illustrating a configuration of a neighboring terminal according to an embodiment of the present invention.

The neighboring terminal may include a receiving unit 810, a determination unit 820, and a response signal transmission unit 830.

The receiving unit 810 may receive an acoustic signal and an electromagnetic signal. The neighboring terminal may determine whether a distance from the user terminal to the neighboring terminal corresponds to the distance from the user terminal to the target terminal, using a reception time difference between the acoustic signal and the electromagnetic signal received by the receiving unit 810.

The determination unit 820 may determine whether the corresponding neighboring terminal corresponds to the target terminal using the acoustic signal and the electromagnetic signal being received. A process of the determining will be described with reference to FIG. 9.

When the determination unit 820 determines that the corresponding neighboring terminal the determination unit 820 corresponds to the target terminal, the response signal transmission unit 830 may transmit a response signal to the user terminal.

Among neighboring terminals, only neighboring terminals of which the distances to the user terminal are within a predetermined range (d−Δd/2)~(d+Δd/2) may receive the acoustic signal and the electromagnetic signal within a predetermined range ($T_o$−Δt/2)~($T_o$+Δt/2). This may not be distance filtering for selecting only a target terminal located accurately at the distance d from the user terminal but distance filtering for selecting neighboring terminals of which distances from the user terminal are within the range (d−Δd/2)~(d+Δd/2). Therefore, the neighboring terminal located within the predetermined range (d−Δd/2)~(d+Δd/2) among the neighboring terminals may transmit the response signal to the user terminal.

Figure 9:
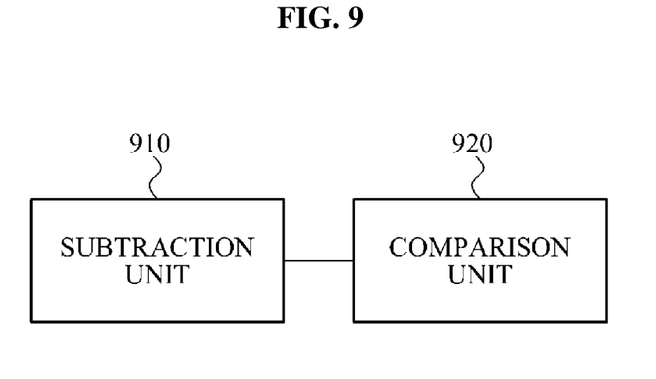
FIG. 9 is a diagram illustrating a configuration of a determination unit of the neighboring terminal, according to an embodiment of the present invention.

FIG. 9 is a diagram illustrating a configuration of the determination unit 820 of the neighboring terminal, according to an embodiment of the present invention.

The determination unit 820 may include a subtraction unit 910 and a comparison unit 920.

The subtraction unit 910 may obtain a reception time difference between an acoustic signal and an electromagnetic signal received by the receiving unit 810. The reception time difference between the acoustic signal and the electromagnetic signal may be varied according to the distance from the user terminal to the neighboring terminal receiving the two signals.

The comparison unit 920 may use the reception time difference to select terminals of which distances from the user terminal correspond to the distance from the user to the target terminal among the neighboring terminals. In addition, the comparison unit 920 may determine whether a distance from the user terminal to a neighboring terminal to which the comparison unit 920 belongs is within a predetermined range. When the distance information is within the predetermined range, the neighboring terminal to which the comparison unit 920 belongs may be determined to be a target terminal to be communicated with the user terminal.

For example, when the reception time difference is greater than $T_o$, the neighboring terminal may be understood to be located nearer than the target terminal to be communicated with the user terminal. Here, $T_o$ denotes an offset of a predetermined transmission delay and may be known in advance to the neighboring terminal receiving the acoustic signal and the electromagnetic signal. $T_o$ may be a positive number, a negative number, or zero.

When the reception time difference is smaller than $T_o$, the neighboring terminal may be understood to be located farther than the target terminal to be communicated with the user terminal.

Conversely, when the reception time difference is $T_o$, the neighboring terminal may be determined to be the target terminal to be communicated with the user terminal.

When the reception time difference is smaller or greater than $T_o$ but is within the predetermined range (To−Δt/2)~(To+Δt/2), the neighboring terminal is located within the range (d−Δd/2)~(d+Δd/2). Therefore, the neighboring terminal may be the target terminal to be communicated with the user terminal.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of spatial filtering using a difference in propagation delay between an electromagnetic signal and an acoustic signal, the method comprising:
    a user terminal transmitting the acoustic signal to neighboring terminals to select terminals of which distances from the user terminal correspond to a distance from the user terminal to a target terminal among neighboring terminals;
    transmitting the electromagnetic signal to the neighboring terminals after a predetermined transmission delay using the distance from the user terminal to the target terminal; and
    receiving response signals from neighboring terminals of which distances from the user terminal are within a predetermined range, among the neighboring terminals that have received the acoustic signal and the electromagnetic signal.

2. The method of claim 1, wherein the distance from the user terminal to the target terminal is stored in the user terminal in advance.

3. The method of claim 1, wherein the transmission delay is determined using the distance from the user terminal to the target terminal.

4. The method of claim 3, wherein the predetermined transmission delay is determined by Equation 3:

$$t = d/V_a - d/V_e + T_o$$

wherein, d denotes the distance from the user terminal to the target terminal, $V_a$ denotes a speed of the acoustic signal, $V_e$ denotes a speed of the electromagnetic signal, $T_o$ denotes an offset of the transmission delay.

5. A method of spatial filtering using a difference in propagation delay between an electromagnetic signal and an acoustic signal, the method comprising:
    a neighboring terminal receiving the acoustic signal from a user terminal;
    receiving the electromagnetic signal transmitted after a predetermined transmission delay using the distance from the user terminal to the target terminal;
    determining whether the neighboring terminal corresponds to the target terminal using a reception time difference between the acoustic signal and the electromagnetic signal from the user terminal to neighboring terminals; and
    transmitting a response signal to the user terminal when the reception time difference is within a predetermined range.

6. The method of claim 5, wherein the determining is performed using the reception time difference between the acoustic signal and the electromagnetic signal.

7. The method of claim 6, wherein the distance information corresponds to the target terminal when the reception time difference between the acoustic signal and the electromagnetic signal is zero, and also corresponds to the target terminal when the reception time difference is within a predetermined range.

8. An apparatus for spatial filtering using a difference in propagation delay between an electromagnetic signal and an acoustic signal, the apparatus comprising:
    a distance information measurement unit storing a distance from a user terminal to a target terminal;
    a transmission unit to transmit an acoustic signal and an electromagnetic signal with a transmission delay using the distance to determine whether neighboring terminals correspond to the target terminal; and
    a response signal receiving unit to receive a response signal from neighboring terminals that have received the acoustic signal and the electromagnetic signal.

9. The apparatus of claim 8, wherein the transmission unit comprises:
    a signal and data transmission unit to transmit the acoustic signal and the electromagnetic signal; and
    a transmission time control unit to control transmission delay for transmission of the electromagnetic signal.

10. The apparatus of claim 9, wherein the signal and data transmission unit transmits the electromagnetic signal after a transmission delay preset by the transmission time control unit.

11. The apparatus of claim 9, wherein the transmission time control unit controls the transmission delay for transmission of the acoustic signal and the electromagnetic signal to the neighboring terminals using the distance from the user terminal to the target terminal.

12. The apparatus of claim 8, wherein the receiving unit to receive the response signal receives the response signal from neighboring terminals of which a reception time difference between the acoustic signal and the electromagnetic signal received by the neighboring terminals is within a predetermined range, among the neighboring terminals that have received the acoustic signal and the electromagnetic signal.

13. An apparatus for spatial filtering using a difference in propagation delay between an electromagnetic signal and an acoustic signal, the apparatus comprising:
    a receiving unit to receive an acoustic signal and an electromagnetic signal;
    a determination unit to determine whether a neighboring terminal corresponds to a target terminal using the acoustic signal and the electromagnetic signal; and
    a response signal transmission unit to transmit a response signal from the neighboring terminal corresponding to the target terminal to a user terminal.

14. The apparatus of claim 13, wherein the determination unit comprises:
    a subtraction unit to obtain a reception time difference between the acoustic signal and the electromagnetic signal; and
    a comparison unit to determine whether a distance from the user terminal to the neighboring terminal correspond to a distance from the user terminal to the target terminal using the reception time difference.

15. The apparatus of claim 14, wherein the comparison unit determines that the distance information corresponds to the target terminal when the reception time difference is zero, and also corresponds to the target terminal when the reception time difference is within a predetermined range.

* * * * *